3,012,983
ACRYLONITRILE POLYMER PLASTICIZED WITH AN AROMATIC SULFONAMIDE AND AN ALKYLENE DINITRILE
Joseph R. Darby, Webster Groves, and Paul R. Graham, Richmond Heights, Mo., assignors to Monsanto Chemical Company, St. Louis, Mo., a corporation of Delaware
No Drawing. Filed Sept. 9, 1957, Ser. No. 682,621
14 Claims. (Cl. 260—30.8)

This invention relates to new and useful acrylonitrile polymer compositions and to shaped articles obtained therefrom. More particularly, this invention relates to plasticized compositions comprising an acrylonitrile polymer, an alkylene dinitrile and an aromatic sulfonamide.

Aromatic sulfonamides of the structure $$R-SO_2-NH-R_1$$

where R is an aromatic hydrocarbon radical and where $R_1$ is hydrogen or an alkyl radical, while per se are incompatible with acrylonitrile polymers, have been found in accordance with this invention to be highly efficient plasticizers for said polymers when admixed with an alkylene dinitrile.

Among the aromatic sulfonamides contemplated are those of the foregoing structure, wherein R is phenyl, tolyl, xylyl, isopropylphenyl, tert. butylphenyl, isoamylphenyl, n-hexylphenyl, cyclohexylphenyl, benzyl, phenylmethyl, phenylethyl, xenyl, naphthyl, and the like, and the various isomeric forms thereof, and where $R_1$ is hydrogen or an alkyl radical such as methyl, ethyl, propyl, butyl, amyl, and the like, and the various isomeric forms thereof. It is particularly preferred that R be a benzenoid hydrocarbon radical containing from 7 to 12 carbon atoms and that $R_1$ be an alkyl radical containing 1 to 5 carbon atoms.

The alkylene dinitriles of this invention are those of the structure $$NC-R-CN$$

wherein R is an alkylene radical containing 1 to 4 carbon atoms and as illustrative of such are malonitrile, succinonitrile, glutaronitrile, adiponitrile, 2,2-dimethyl succinonitrile, 2,3-dimethyl succinonitrile, and the like.

The aromatic sulfonamide and the alkylene dinitrile may be admixed with the acrylonitrile by a wide variety of mechanical procedures. Thusly, the polymer in granular form may be mixed physically with the aromatic sulfonamide and alkylene dinitrile or in aqueous or organic solutions or dispersions of either or mixtures thereof. It is preferred, however, to use any of the well known organic solvents for the acrylonitrile polymers in the presence of which the intimate dispersing of the aromatic sulfonamide and the alkylene dinitrile and the acrylonitrile polymer is more readily effected. The nature of the solvent, which is useful in dissolving or softening the acrylonitrile polymer, will to a large extent depend upon the composition of the acrylonitrile polymers and its chemical reactivity with respect to the aromatic sulfonamide and alkylene dinitrile. Any of the well known solvents for acrylonitrile polymers may be employed provided such is a solvent for and is chemically inert with respect to both the aromatic sulfonamide and the alkylene dinitrile. Typical of such solvents are dimethyl formamide, dimethyl acetamide, tetrahydropyran, tetrahydrofuran, morpholine, various organophosphonates, ethylene carbonate, various sulfones, etc. Of these well known solvents N,N-dimethyl formamide is preferred.

Employing conventional techniques, such solutions or dispersions upon extruding, casting, etc., into a medium which removes the solvent from the solution yields a precipitate containing a homogeneous mixture of the acrylonitrile polymer, the alkylene dinitrile, and the aromatic sulfonamide, which precipitate is characterized by excellent chemical and physical properties, particularly with respect to flexibility.

The acrylonitrile polymers which are rendered more flexible in accordance with this invention are polyacrylonitrile, copolymers of acrylonitrile with minor proportions of other monoolefinic compounds copolymerizable therewith, and mixtures of acrylonitrile polymers with other polymeric compositions, including olefinic polymers, or other types of polymeric substances. These mixtures, or blended polymeric compositions, are especially useful for the purpose of developing dye-receptive polymers, for example by blending non-dyeable acrylonitrile polymers with a minor proportion of a polymer chemically reactive with dyestuff. In general, there is a minimum proportion of acrylonitrile which should be present in polymeric form in order to have adequate tensile properties in the fibers prepared therefrom. Thus a polymer of a monomeric mixture of which acrylonitrile is at least 75 percent of the polymerizable content is useful in the practice of this invention. Acrylonitrile polymers other than polyacrylonitrile which are rendered more flexible in accordance with this invention, and which are preferred for use in the practice of this invention, are the copolymers of 85 or more percent of acrylonitrile and one or more of other mono-olefinic monomers.

Illustrative examples of monomers which may be copolymerized with acrylonitrile to yield a polymerization product containing in the polymer molecules an average of at least 75% by weight of acrylonitrile are compounds containing a single $CH_2=C<$ grouping, for instance, the vinyl esters and especially the vinyl esters of monocarboxylic acids, e.g. vinyl acetate, vinyl propionate, vinyl butyrate, vinyl chloroacetate, etc.; vinyl and vinylidene halides, e.g. the vinyl and vinylidene chlorides, bromides and fluorides; allyl type alcohols, e.g. allyl alcohol, methallyl alcohol, ethallyl alcohol, etc.; allyl, methallyl and other unsaturated monohydric alcohol esters of monobasic acids, e.g. allyl and methallyl, acetates, chloroacetates, laurates, cyanides, etc.; acrylic and alkacrylic acids, (e.g. methacrylic, ethacrylic, etc.), and esters and amides of such acids (e.g. methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon substituted acrylontriles; styrene and other vinyl substituted aromatic hydrocarbons, e.g. o-methyl styrene, p-methyl styrene, etc.; vinyl pyridines such as α-vinyl pyridine and other vinyl substituted heterocyclic nitrogen ring compounds, as for example the alkyl substituted vinyl pyridines, etc.; unsaturated aliphatic hydrocarbons containing a single $CH_2=C<$ group, e.g. isobutylene, etc.; and numerous other vinyl, acrylic and other compounds containing a single $CH_2=C<$ grouping which are copolymerizable with acrylonitrile to yield thermoplastic polymers. The α,β-unsaturated dicarboxylic acids, their anhydrides and alkyl and di-alkyl esters may also be copolymerized with acrylonitrile to form copolymers which are useful in practicing the present invention, e.g. maleic acid, maleic anhydride, fumaric acid, dibutyl maleate, butyl acid maleate, citraconic acid, citraconic anhydride, etc.

Any suitable method of polymerizing the monomeric acrylonitrile or mixture of monomers may be employed. One method comprises polymerizing the monomeric acrylonitrile or mixture of monomers in an aqueous emulsion using a suitable polymerization catalyst, e.g. ammonium persulfate. However, it is desirable that the polymers be uniform with respect to molecular weight, particle size, and chemical composition. In general, the molecular weight should be in excess of 10,000 and preferably in excess of 25,000, the molecular weights being determined by measuring the viscosity of dilute solutions in the manner well known in the art. Generally, those polymers having a molecular weight between 40,000 and 250,000 are preferred.

The proportions of the acrylonitrile polymerization product and the plasticizer mixture, i.e. the aromatic sulfonamide and the alkylene dinitriles in the compositions of our invention may be varied widely, depending mainly upon the particular use for which the composition is intended. For some applications, e.g. where the plasticizer is intended to be permanent, and the plasticized composition will not come into contact with a solvent for the plasticizer mixture, the latter may constitute 50% or more by weight of the composition. In other applications, e.g. when the plasticized composition is to be extruded through an orifice to form filaments (mono- or multi-filaments) then the acrylonitrile polymerization product is generally plasticized with a plasticizing amount not substantially exceeding about 25% (e.g. from 1% to about 10 or 15%) by weight of the composition. In general the proportions of aromatic sulfonamide and alkylene dinitrile useful in plasticizing the acrylonitrile polymerization product will range from about 1 to about 30 parts of aromatic sulfonamide and from about 5 to about 90 parts of alkylene dinitrile for each 100 parts by weight of acrylonitrile polymer. Optimum results are obtained when the ratio of alkylene dinitrile to aromatic sulfonamide is 3 to 1.

In the preferred practice of this invention acrylonitrile polymer solutions are prepared by dispersing the finely divided polymers, the alkylene dinitrile and the aromatic sulfonamide in an inert organic solvent followed by heating with stirring, tumbling or other agitation until a free-flowing homogeneous solution or dispersion is obtained. It is desirable to use a solution or dispersion of as high a concentration as possible of acrylonitrile polymer, but the maximum concentration will be dependent upon the molecular weight of the polymer and the viscosity characteristics of the mixture. To obtain fibers or films of optimum physical properties acrylonitrile polymers of molecular weights in excess of 25,000 are used. While as little as 5% of the polymer can be used in a spinning or casting solution, such low concentrations are undesirable because they necessitate the removal of too much solvent from the extruded solution thereby increasing solvent recovery cost. The concentration of polymer in the spinning or casting solution is usually between 8 and 35%, but concentrations above 35% are also contemplated. The concentration of the polymer will ultimately be determined by considering the desired physical properties of the fiber or film. The viscosity will depend upon the chemical composition and molecular weight of the polymer, and the optimum concentration can best be determined by selecting a uniform high molecular weight polymer having good fiber-forming or film-forming properties and having as little an amount of solvent as possible to form a viscous solution capable of being spun or cast at convenient temperatures to provide a finished flexible fiber or film.

It is not understood whether a chemical reaction is involved between the alkylene dinitrile and/or the aromatic sulfonamide and the acrylonitrile polymer, or whether the presence of the said alkylene dinitrile and/or the aromatic sulfonamide effects a reorientation of the acrylonitrile polymer. In this regard it is to be understood that the instant invention is not limited to any physical or chemical change, but is directed broadly to the flexible product obtained by admixing the said alkylene dinitrile and aromatic sulfonamide with an acrylonitrile polymer and heating said composition under conditions which ultimately provide for a flexible shaped article.

In order that those skilled in the art may understand how the present invention can be carried into effect, the following examples are given by way of illustration and not by way of limitation. All parts are parts by weight.

EXAMPLE 1

Plasticized acrylonitrile compositions are prepared by adding, in the weight proportions set forth in Table A below, the alkylene dinitrile and the aromatic sulfonamide to a 10% solution of homopolymeric polyacrylonitrile dissolved in dimethyl formamide, the latter being at room temperature (approx. 25° C.). The mixture is then stirred and heated until a clear viscous solution results. The solution is poured on a glass plate, cast and the solvent evaporated by placing the coated glass plate in an oven maintained at a temperature of 80° C. The resultant film, which is about 4 mils thick, is then peeled from the glass plate and subjected to various tests which indicate the physical properties of the film. The results of these tests are reported in Table B below.

Table A
FORMULATIONS

|  | 1 | 2 | 3 |
|---|---|---|---|
| Polyacrylonitrile | 100 | 100 | 100 |
| Succinonitrile |  | 75 | 37.5 |
| N-ethyl toluenesulfonamide [1] |  | 25 | 12.5 |

[1] Contains approximately 25% by weight of N-ethyl-paratoluenesulfonamide and approximately 75% by weight of N-ethyl-ortho-toluenesulfonamide.

Table B
PHYSICAL PROPERTIES OF FILM

|  | 1 | 2 | 3 |
|---|---|---|---|
| Volatility, Percent Plast. lost (ASTM Method D-1203-52 T) | 0 | 23.1 | 17.4 |
| $H_2O$ Extraction, Percent Plast. lost ASTM Method D-1239-52 T) | 0 | 40.6 | 27.3 |
| Tensile properties,[1] Tensile strength, p.s.i. | 9,310.0 | 773.0 | 1,390.0 |
| Modulus of Elasticity, p.s.i.×10⁴ | 32.9 | 1.17 | 4.74 |
| Elongation, Percent | 26.0 | 605.0 | 283.0 |

[1] These properties are determined on 5 conditioned dumbbell specimens of the test film, using an Instron Test Machine, Model TC, at an extension rate of 0.1 inch per minute. The tests are determined in accordance with ASTM-Method D-638-52 T.

The above results indicate qualitatively the plasticizing effect of a mixture of succinonitrile and N-ethyl-toluenesulfonamide on the polyacrylonitrile.

EXAMPLE 2

Example 1 is repeated except that the proportion of plasticizer mixture is varied so as to produce compositions containing 5%, 10%, 15%, 25% and 55% by weight of the plasticizer mixture, based on the total weight of the plasticizer mixture and polyacrylonitrile. The ratio of succinonitrile to the N-ethyl toluene sulfonamide is maintained at 3:1. Similar results are obtained, in that the film containing the higher percentage of the plasticizer mixture exhibits lower tensile strength and modulus properties and high elongation, $H_2O$ extraction and volatility, whereas the reverse is true of the compositions containing lower amounts of plasticizer mixture.

EXAMPLE 3

Example 1 is repeated but using, in place of the homopolymeric acrylonitrile, the following copolymers of acrylonitrile in the individual tests:

Copolymer produced from a mixture of—
 (1) 98% acrylonitrile and 2% vinyl acetate
 (2) 95% acrylonitrile and 5% α-vinyl pyridine
 (3) 95% acrylonitrile and 5% vinyl acetate
 (4) 85% acrylonitrile and 15% methyl methacrylate
 (5) 95% acrylonitrile and 5% acrylic acid
 (6) 90% acrylonitrile and 10% dibutyl maleate (7) 85% acrylonitrile and 7.5% methyl acrylate and 7.5% 2-methyl-5-vinylpyridine
(8) 98% acrylonitrile and 2% styrene
(9) 90% acrylonitrile and 10% hydroxyethyl methacrylate
(10) 75% acrylonitrile and 12.5% methylmethacrylate and 12.5% vinyl acetate
(11) 79% acrylonitrile and 21% methacrylic acid
(12) 85% acrylonitrile and 15% methacrylic acid
(13) 80% acrylonitrile, 10% methyl acrylate and 10% vinyl acetate
(14) 90% acrylonitrile and 10% vinyl butyrate
(15) 90% acrylonitrile and 10% vinylidene chloride In each case the plasticizer mixture (of formulation 2 and 3 of Example 1 above) exerts a definite plasticizing effect on the acrylonitrile copolymer when using the same tests as in Example 1.

EXAMPLE 4

Example 1 is repeated but using, in place of the N-ethyl sulfonamide, the following aromatic sulfonamides:

(1) N-ethyl benzenesulfonamide
(2) N-methyl-para-isopropylphenylsulfonamide
(3) N-isoamyl-para-toluenesulfonamide
(4) N-n-butyl-ortho-toluenesulfonamide
(5) N-ethyl-naphthalenesulfonamide
(6) N-ethyl-cyclohexylphenylsulfonamide
(7) N-methyl-para-hexylphenylsulfonamide
(8) N-ethyl-para-xylenesulfonamide
(9) N-methyl phenylethylsulfonamide
(10) N-isopropyl-para-toluenesulfonamide In each case the plasticizer mixture, i.e. of the above sulfonamides and succinonitrile, exerts a definite plasticizing effect on the homopolymer of acrylonitrile when using the same tests as in Example 1.

Plasticizing effects are also observed when the succinonitrile in Example 1, formulations 2 and 3, is replaced by the following alkylene dinitriles: adiponitrile, glutoronitrile and malononitrile.

From the foregoing description it will be seen that the present invention provides compositions comprising (1) an acrylonitrile polymerization product containing in the polymer molecules thereof an average of at least 75% by weight of acrylonitrile, and (2) a plasticizer mixture which comprises an alkylene dinitrile and an N-alkyl-aromatic sulfonamide, in an amount sufficient to plasticize the acrylonitrile polymerization product. These compositions can be shaped or fabricated, as by extrusion, molding, casting (from a solution thereof), etc. into a wide variety of useful articles. Lubricants, antistatic agents, stabilizers and other conventional modifiers of acrylonitrile polymerization products can be incorporated therein at any suitable stage of the operation. Although not limited thereto the compositions of this invention are particularly useful in the production of filaments, threads, yarns, films, foils, strands, etc., which thereafter can be woven into fabrics; in the production of molding compositions and molded articles; and also as capacitor dielectrics and in other applications of dielectrics.

While this invention has been described with respect to certain embodiments, it is not so limited, and it is to be understood that variations and modifications thereof which are obvious to those skilled in the art may be made without departing from the spirit or scope of the invention.

What is claimed is:

1. A composition of matter comprising (1) a polymerization product containing in the polymer molecules an average of at least 75% by weight of acrylonitrile monomer units, any balance being derived from a monoethylenically unsaturated comonomer, and a plasticizer mixture of (2) from 1 to about 30 parts per 100 parts by weight of polymer of an aromatic sulfonamide of the structure $$R-SO_2-NH-R_1$$

wherein R is an aromatic hydrocarbon radical and $R_1$ is selected from the group consisting of hydrogen and an alkyl radical, and (3) from .5 to about 90 parts per 100 parts by weight of polymer of an alkylene dinitrile of the structure $$N\equiv C-R-C\equiv N$$

wherein R is an alkylene radical having up to four (4) carbon atoms, the weight ratio of alkylene dinitrile to aromatic sulfonamide being within the range of 5 to 1 to 3 to 1.

2. A composition of matter comprising (1) a polymerization product containing in the polymer molecules an average of at least 85% by weight of acrylonitrile monomer units, any balance being derived from a monoethylenically unsaturated comonomer, and a plasticizer mixture of (2) from 1 to about 30 parts per 100 parts by weight of polymer of an aromatic sulfonamide of the structure $$R-SO_2-NH-R_1$$

wherein R is a benzenoid hydrocarbon radical containing from seven (7) to twelve (12) carbon atoms and $R_1$ is an alkyl radical having up to five (5) carbon atoms; and (3) from 5 to about 90 parts per 100 parts by weight of polymer of an alkylene dinitrile of the structure $$N\equiv C-R-C\equiv N$$

wherein R is an alkylene radical having up to four (4) carbon atoms, the weight ratio of alkylene dinitrile to aromatic sulfonamide being within the range of 5 to 1 to 3 to 1.

3. The composition of claim 2 wherein the aromatic sulfonamide is N-ethyl-para-toluene sulfonamide.

4. The composition of claim 2 wherein the aromatic sulfonamide is a mixture of N-ethyl-ortho-toluene sulfonamide and N-ethyl-para-toluene sulfonamide.

5. The composition of claim 2 wherein the alkylene dinitrile is succinonitrile.

6. The composition of claim 2 wherein the acrylonitrile polymer has an average molecular weight of from 40,000 to 250,000.

7. The composition of claim 2 wherein the weight ratio of alkylene dinitrile to aromatic sulfonamide is 3:1.

8. A plasticized composition comprising a polymerization product containing in the polymer molecules an average of at least 75% by weight of acrylonitrile monomer units, any balance being derived from a monoethylenically unsaturated comonomer, said polymerization product being plasticized with a plasticizing amount in the range of from about 5% to about 55% by weight of the composition, of a mixture of (1) an aromatic sulfonamide of the structure $$R-SO_2-NH-R_1$$

wherein R is an aromatic hydrocarbon radical and $R_1$ is selected from the group consisting of hydrogen and an alkyl radical and of (2) an alkylene dinitrile of the structure $$N\equiv C-R-C\equiv N$$

wherein R is an alkylene radical having up to four (4) carbon atoms, the weight ratio of alkylene dinitrile to aromatic sulfonamide being within the range of 5 to 1 to 3 to 1.

9. A plasticized composition comprising a polymerization product containing in the polymer molecules an average of at least 85% by weight of acrylonitrile monomer units, any balance being derived from a monoethylenically unsaturated comonomer, said polymerization product being plasticized with a plasticizing amount in the range of from about 5% to about 25% by weight of the composition, of a mixture of (1) an aromatic sulfonamide of the structure $$R-SO_2-NH-R_1$$

wherein R is a benzenoid hydrocarbon radical containing from seven (7) to twelve (12) carbon atoms and $R_1$ is an alkyl radical having up to five (5) carbon atoms and of (2) an alkylene dinitrile of the structure $$N{\equiv}C-R-C{\equiv}N$$

wherein R is an alkylene radical having up to four (4) carbon atoms, the weight ratio of alkylene dinitrile to aromatic sulfonamide being within the range of 5 to 1 to 3 to 1.

10. The composition of claim 9 wherein the aromatic sulfonamide is N-ethyl-para-toluene sulfonamide.

11. The composition of claim 9 wherein the aromatic sulfonamide is a mixture of N-ethyl-ortho-toluene sulfonamide and N-ethyl-para-toluene sulfonamide.

12. The composition of claim 9 wherein the alkylene dinitrile is succinonitrile.

13. The composition of claim 9 wherein the acrylonitrile polymer has an average molecular weight of from 40,000 to 250,000.

14. The composition of claim 9 wherein the weight ratio of alkylene dinitrile to aromatic sulfonamide is 3:1.

References Cited in the file of this patent

UNITED STATES PATENTS

| | | |
|---|---|---|
| 2,628,954 | Gilbert | Feb. 17, 1953 |
| 2,757,156 | Dazzi | July 31, 1956 |
| 2,787,606 | Coover et al. | Apr. 2, 1957 |
| 2,855,375 | Dobay | Oct. 7, 1958 |